May 14, 1929.　　　O. LUNDELL　　　1,713,390
BROACHING TOOL
Filed Oct. 6, 1926
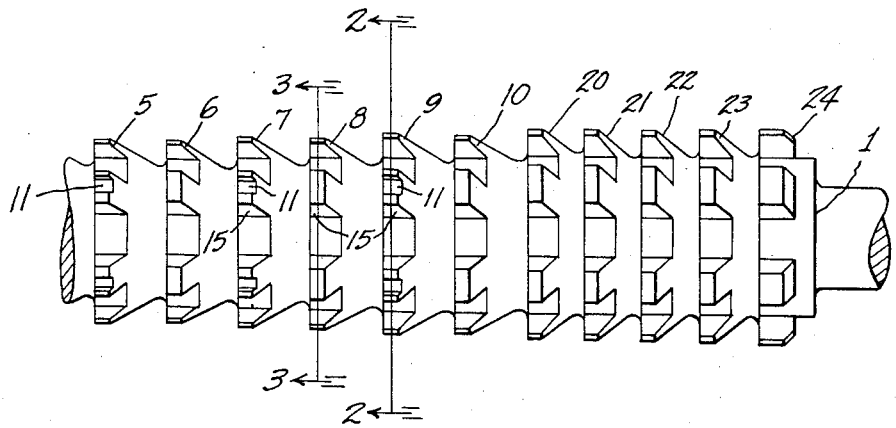
Fig. 1
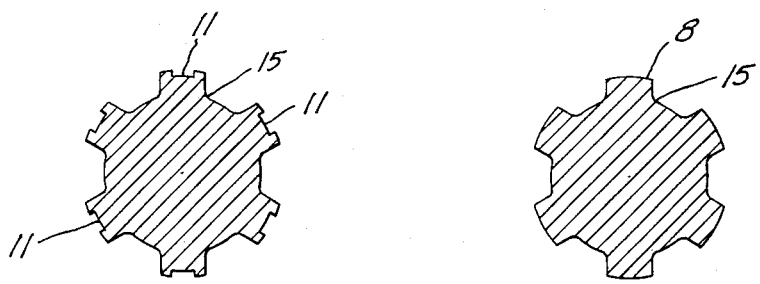
Fig. 2　　　　　Fig. 3
Fig. 4.
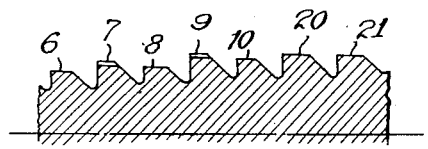
Inventor
OTTO LUNDELL
By
Attorney Patented May 14, 1929.

1,713,390

UNITED STATES PATENT OFFICE.

OTTO LUNDELL, OF DETROIT, MICHIGAN, ASSIGNOR TO COLONIAL TOOL COMPANY, OF DETROIT, MICHIGAN, A CORPORATION OF MICHIGAN.

BROACHING TOOL.

Application filed October 6, 1926. Serial No. 139,935.

It is the object of my invention to provide a broaching tool wherein the rough cutting strain is equally distributed over all of the cutting teeth.

With this and other objects in view, my invention consists in the arrangement, combination and construction of the various parts of my improved device, as described in the specification, claimed in my claims, and shown in the accompanying drawing, in which:

Fig. 1 is an elevation of my device with end portions broken away.

Fig. 2 is a sectional view taken on line 2—2 of Fig. 1.

Fig. 3 is a sectional view taken on line 3—3 of Fig. 1.

Fig. 4 is a more-or-less diagrammatic fragmentary sectional view through one of the rows of teeth showing their relative proportions.

I have shown a broach 1 having a plurality of rows of longitudinally aligned teeth of equal width circumferentially disposed thereon. The teeth disposed in the circumferential rows 5, 6, 7, 8, 9 and 10 are roughing teeth, and the teeth disposed in the circumferential rows 20, 21, 22, 23 and 24 are finishing teeth. The teeth in rows 5, 7 and 9 are formed with notches 11 in their upper cutting surfaces which are approximately one-half the width of the spline to be cut in the workpiece, and the teeth in rows 6, 8 and 10 are formed with plain upper cutting surfaces to catch and cut away the greater portions of the ridges which will be left by the notches 11 in teeth in rows 5, 7 and 9.

The finishing teeth in rows 20, 21, 22, 23 and 24 all have plain upper cutting surfaces. The teeth in row 5 are of greater length than the teeth in row 6, the teeth in row 7 are of greater length than the teeth in row 5 and the teeth in row 8, and the teeth in row 9 are of greater length than the teeth in row 7 and the teeth in row 10. Thus the teeth in rows 5, 7 and 9 progressively increase in length as do the teeth in rows 6, 8 and 10, and each tooth in rows 5, 7 and 9 is of greater length than the succeeding tooth in rows 6, 8, and 10. The finishing teeth in rows 20, 21, 22, 23 and 24 are of substantially the same length as teeth in row 9. The side surfaces of all the teeth are radiused at the point 15 where they join the body of the broach in order to provide means for shaping the edges of the splines in the workpiece.

The advantage of the notches 11 in the alternate teeth is to distribute the strain equally over all cutting teeth and at the same time utilize all the teeth in shaping the sides and edges of the spline in the workpiece, thus insuring accuracy. Another advantage is that the teeth in rows 5, 7 and 9 reduce the amount of material which the corners of the teeth in rows 6, 8 and 10 must remove, and inasmuch as it is at these corners that the greatest and controlling wear occurs in conventional broaches, the present construction materially aids in increasing the useful life of a broach of this type.

The advantage of having the alternate notched teeth of greater length than the following plain rough cutting teeth lies in the equalization of the strain, and the insurance of accuracy as paths are provided for the subsequent notched teeth to follow, the intermediate plain cutting teeth, being shorter than the preceding notched teeth, do not entirely cut away the portion left by the notched teeth, and thereby leave grooves at each side of the cut opening in the workpiece which are followed and deepened by the succeeding notched teeth.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. A broaching tool comprising a bar having a longitudinally extending row of radially projecting teeth thereon for cutting a groove, the alternate cutting teeth having centrally disposed grooves in their upper cutting surfaces, the intermediate cutting teeth having plain upper cutting surfaces, the cutting surface of all of said teeth being of substantially equal width, said grooved cutting teeth being progressively lengthened rearwardly from the initial cutting teeth, and said plain surfaced cutting teeth being progressively lengthened rearwardly from the initial plain surfaced cutting tooth, each of said plain surfaced cutting teeth being shorter than its preceding grooved cutting tooth 2. A broaching tool comprising a bar having a plurality of longitudinally extending rows of radially projecting teeth thereon for rough cutting and finishing grooves, the alternate rough cutting teeth in said longitudinal rows having centrally disposed grooves in their upper cutting surfaces, the intermediate rough cutting teeth having plain upper cutting surfaces, all of said teeth being substantially the same width of cutting face, said grooved rough cutting teeth being progressively lengthened rearwardly from the initial cutting end of said rows, and said plain surfaced rough cutting teeth being progressively lengthened rearwardly from the initial plain surfaced cutting teeth in the respective rows, each of said plain surfaced rough cutting teeth being shorter than its preceding grooved rough cutting tooth.

3. A broaching tool comprising a bar having a longitudinally extending row of radially projecting teeth thereon for rough cutting and finishing a groove, the alternate rough cutting teeth having centrally disposed grooves in their upper cutting surfaces, the intermediate rough cutting teeth having plain upper cutting surfaces, all of said teeth having substantially the same width of cutting face, said grooved rough cutting teeth being progressively lengthened rearwardly from the initial cutting teeth, and said plain surfaced rough cutting teeth being progressively lengthened rearwardly from the initial plain surfaced cutting tooth, each of said plain surfaced cutting teeth being shorter than its preceding grooved rough cutting tooth, and the finishing teeth in said row being of equal length and having plain upper cutting surfaces.

4. A broaching tool comprising a bar having a plurality of longitudinally extending rows of radially projecting teeth thereon for rough cutting and finishing grooves, the alternate rough cutting teeth in said longitudinal rows having grooves in their upper cutting surfaces between the side edges thereof, the intermediate rough cutting teeth having plain upper cutting surfaces, all of said teeth being of substantially the same width at their cutting edges, said grooved rough cutting teeth being progressively lengthened rearwardly from the initial cutting end of said rows, the said plain surfaced rough cutting teeth in said rows being progressively lengthened from the initial plain surfaced cutting tooth in their respective rows, and each of said plain surfaced rough cutting teeth being shorter than its preceding grooved rough cutting tooth, and the finishing teeth in said rows being of equal length and having plain upper cutting surfaces.

OTTO LUNDELL.